(12) United States Patent
Sami

(10) Patent No.: US 12,511,399 B2
(45) Date of Patent: Dec. 30, 2025

(54) SECURE SOFTWARE UPDATE FOR INTERNET-CONNECTED MEDICAL DEVICES

(71) Applicant: Abiomed, Inc., Danvers, MA (US)

(72) Inventor: Muhammad Kamran Sami, Northbridge, MA (US)

(73) Assignee: Abiomed, Inc., Danvers, MA (US)

( * ) Notice: Subject to any disclaimer, the term of this patent is extended or adjusted under 35 U.S.C. 154(b) by 130 days.

(21) Appl. No.: 18/505,336

(22) Filed: Nov. 9, 2023

(65) Prior Publication Data

US 2024/0160742 A1 May 16, 2024

Related U.S. Application Data

(60) Provisional application No. 63/424,263, filed on Nov. 10, 2022.

(51) Int. Cl.
| | |
|---|---|
| *H04L 29/06* | (2006.01) |
| *G06F 8/65* | (2018.01) |
| *G06F 21/57* | (2013.01) |
| *G16H 40/40* | (2018.01) |
| *H04L 9/40* | (2022.01) |

(52) U.S. Cl.
CPC ............ *G06F 21/572* (2013.01); *G06F 8/65* (2013.01); *G16H 40/40* (2018.01); *H04L 63/02* (2013.01); *G06F 2221/033* (2013.01)

(58) Field of Classification Search
CPC .... G06F 21/572; G06F 8/65; G06F 2221/033; G06F 21/57; G16H 40/40; H04L 63/02
See application file for complete search history.

(56) References Cited

U.S. PATENT DOCUMENTS

| | | | |
|---|---|---|---|
| 2020/0222609 A1 | 7/2020 | Ballantyne et al. | |
| 2020/0382472 A1 | 12/2020 | Salin et al. | |
| 2021/0090726 A1 | 3/2021 | Rosinko et al. | |
| 2022/0181012 A1* | 6/2022 | Skelton | G16H 20/30 |
| 2023/0386657 A1* | 11/2023 | Pascal | G16H 40/67 |

OTHER PUBLICATIONS

International Search Report and Written Opinion for International Application No. PCT/US2023/079174 mailed Feb. 28, 2024, 11 pages.

* cited by examiner

*Primary Examiner* — William A Corum, Jr.
(74) *Attorney, Agent, or Firm* — Pierce Atwood LLP

(57) ABSTRACT

Methods and apparatus for securely updating software for a medical device are described. The method comprises receiving, by the medical device from a firewall device, an indication that a software update for the medical device is available, determining whether the medical device is in a patient use state, and sending a request to the firewall device to establish a bidirectional data transfer communication link between the medical device and an Internet-connected device when it is determined that the medical device is not in a patient use state.

18 Claims, 4 Drawing Sheets

SECURE SOFTWARE UPDATE FOR INTERNET-CONNECTED MEDICAL DEVICES

CROSS REFERENCE TO RELATED APPLICATIONS

This application claims the benefit under 35 U.S.C. § 119(e) to U.S. Provisional Patent Application No. 63/424,263, filed Nov. 10, 2022, and titled, "SECURE SOFTWARE UPDATE FOR INTERNET-CONNECTED MEDICAL DEVICES," the entire contents of which is incorporated herein by reference in its entirety.

FIELD OF INVENTION

This disclosure relates to techniques for securely updating software for Internet-connected medical devices.

BACKGROUND

Medical devices that include software components occasionally require software updates to improve functionality of the medical device and/or to protect the medical device from security vulnerabilities. Such software updates are typically required to be manually applied by users without connecting to the Internet to avoid the risks associated with Internet-based software updates.

SUMMARY

Described herein are systems and methods for securely updating software on an Internet-connected medical device.

In one aspect, a system is provided. The system comprises a medical device, a firewall device communicatively coupled to the medical device, and an Internet-connected device communicatively coupled to the firewall device and at least one network. The medical device comprises at least one hardware computer processor and at least one non-transitory storage device encoded with a plurality of instructions that, when executed by the at least one hardware computer processor perform a method for securely updating software stored by the at least one non-transitory storage device. The firewall device and the Internet-connected device are configured to isolate the medical device from the at least one network.

In another aspect, the Internet-connected device is configured to check whether new software is available for the medical device, and download, via the at least one network, software from a secure data server, a software update for the medical device when new software is available for the medical device. In another aspect, the Internet-connected device is configured to check whether new software is available for the medical device by issuing a request to the secure data server to determine whether the new software is available. In another aspect, the Internet-connected device is configured to check whether new software is available for the medical device by receiving an indication from the secure data server that the new software is available. In another aspect, the Internet-connected device is further configured to verify data integrity of the software update. In another aspect, the Internet-connected device is further configured to validate the software update for data tampering. In another aspect, the Internet-connected device is further configured to notify the firewall device that the software update is available for the medical device when the data integrity of the software update is verified and/or the software update is validated for data tampering.

In another aspect, the firewall device is configured to receive, from the Internet-connected device that a software update for the medical device is available, and notify the medical device that the software update for the medical device is available. In another aspect, the firewall device is further configured to receive a request from the medical device to establish a bidirectional data transfer communication link between the medical device and the Internet-connected device, and establish the bidirectional data transfer communication link between the medical device and the Internet-connected device in response to receiving the request.

In another aspect, the method for securely updating software comprises receiving a notification from the firewall device that a software update for the medical device is available, determining whether the medical device is in a patient use state, and sending a request to the firewall device to establish a bidirectional data transfer communication link between the medical device and the Internet-connected device when it is determined that the medical device is not in a patient use state. In another aspect, the medical device further comprises a display configured to show a graphical user interface (GUI), the method for securely updating software comprises receiving a user input via the GUI to perform a software update, and sending the request to the firewall device to establish the bidirectional data transfer communication link is performed in response to receiving the user input to perform the software update. In another aspect, determining whether the medical device is in a patient use state is performed by determining whether the medical device is in an idle state during which is it safe to perform a software update. In another aspect, the method for securely updating software comprises downloading information associated with the software update via the bidirectional data transfer communication link. In another aspect, the method for securely updating software further comprises verifying data integrity of the information associated with the software update and/or validating one or more signatures associated with the information associated with the software update. In another aspect, the method for securely updating software further comprises updating the software stored by the at least one non-transitory storage device in response to verifying data integrity of the information associated with the software update and/or validating one or more signatures associated with the information associated with the software update. In another aspect, the medical device further comprises a display configured to show a graphical user interface (GUI), and the method for securely updating software comprises providing on the GUI an indication of a status of the updating the software.

In another aspect, the firewall device and the Internet-connected device are integrated into a single component, and the single component is partitioned to separate components of the firewall device and components of the Internet-connected device. In another aspect, the medical device comprises a controller for a cardiac support system. In another aspect, the cardiac support system includes a heart pump.

In one aspect, a method of securely updating software for a medical device is provided. The method comprises receiving, by the medical device from a firewall device, an indication that a software update for the medical device is available, determining whether the medical device is in a patient use state, and sending a request to the firewall device to establish a bidirectional data transfer communication link between the medical device and an Internet-connected device when it is determined that the medical device is not in a patient use state.

In another aspect, the method further comprises receiving a user input to perform a software update for the medical device, and sending the request to the firewall device to establish the bidirectional data transfer communication link is performed in response to receiving the user input to perform the software update. In another aspect, determining whether the medical device is in a patient use state is performed by determining whether the medical device is in an idle state during which is it safe to perform a software update. In another aspect, the method further comprises downloading information associated with the software update via the bidirectional data transfer communication link. In another aspect, the method further comprises verifying data integrity of the information associated with the software update and/or validating one or more signatures associated with the information associated with the software update. In another aspect, the method further comprises updating the software for the medical device in response to verifying data integrity of the information associated with the software update and/or validating one or more signatures associated with the information associated with the software update. In another aspect, the method further comprises providing on a display of the medical device, an indication of a status of the updating the software.

In another aspect, the method further comprises receiving by the firewall device, from the Internet-connected device, an indication that a software update for the medical device is available, and providing, by the firewall device to the medical device, the indication that the software update for the medical device is available. In another aspect, the method further comprises receiving, by the firewall device, the request from the medical device to establish a bidirectional data transfer communication link between the medical device and the Internet-connected device, and establishing, by the firewall device, the bidirectional data transfer communication link between the medical device and the Internet-connected device in response to receiving the request from the medical device.

In another aspect, the method further comprises checking, by the Internet-connected device, whether new software is available for the medical device, and downloading, via at least one network, a software update for the medical device from a secure data server to the Internet-connected device when new software is available for the medical device. In another aspect, checking whether new software is available for the medical device is performed by issuing a request from the Internet-connected device to the secure data server to determine whether the new software is available. In another aspect, checking whether new software is available for the medical device is performed by receiving by the Internet-connected device an indication from the secure data server that the new software is available. In another aspect, the method further comprises verifying, by the Internet-connected device, data integrity of the software update. In another aspect, the method further comprises validating, by the Internet-connected device, the software update for data tampering. In another aspect, the method further comprises notifying, the firewall device, by the Internet-connected device, that the software update is available for the medical device when the data integrity of the software update is verified and/or the software update is validated for data tampering. In another aspect, the medical device comprises a controller for a cardiac support system. In another aspect, the cardiac support system includes a heart pump.

DETAILED DESCRIPTION

Internet-connected medical devices are at particular risk of being hacked during software updates, and the performance of the medical device may be affected when directly connected to the Internet. Additionally, attempting to update software while the medical device is in operation may interfere with essential performance of the medical device, putting the patient at risk. For these reasons, medical devices are typically configured to limit over-the-air software updates. The inventor has recognized and appreciated that manually identifying and transferring software installation files to upgrade software on medical devices is inefficient, time consuming and incurs high costs. To this end, some embodiments of the present technology provide a secure system for updating software on an Internet-connected medical device.

Figure 1A:
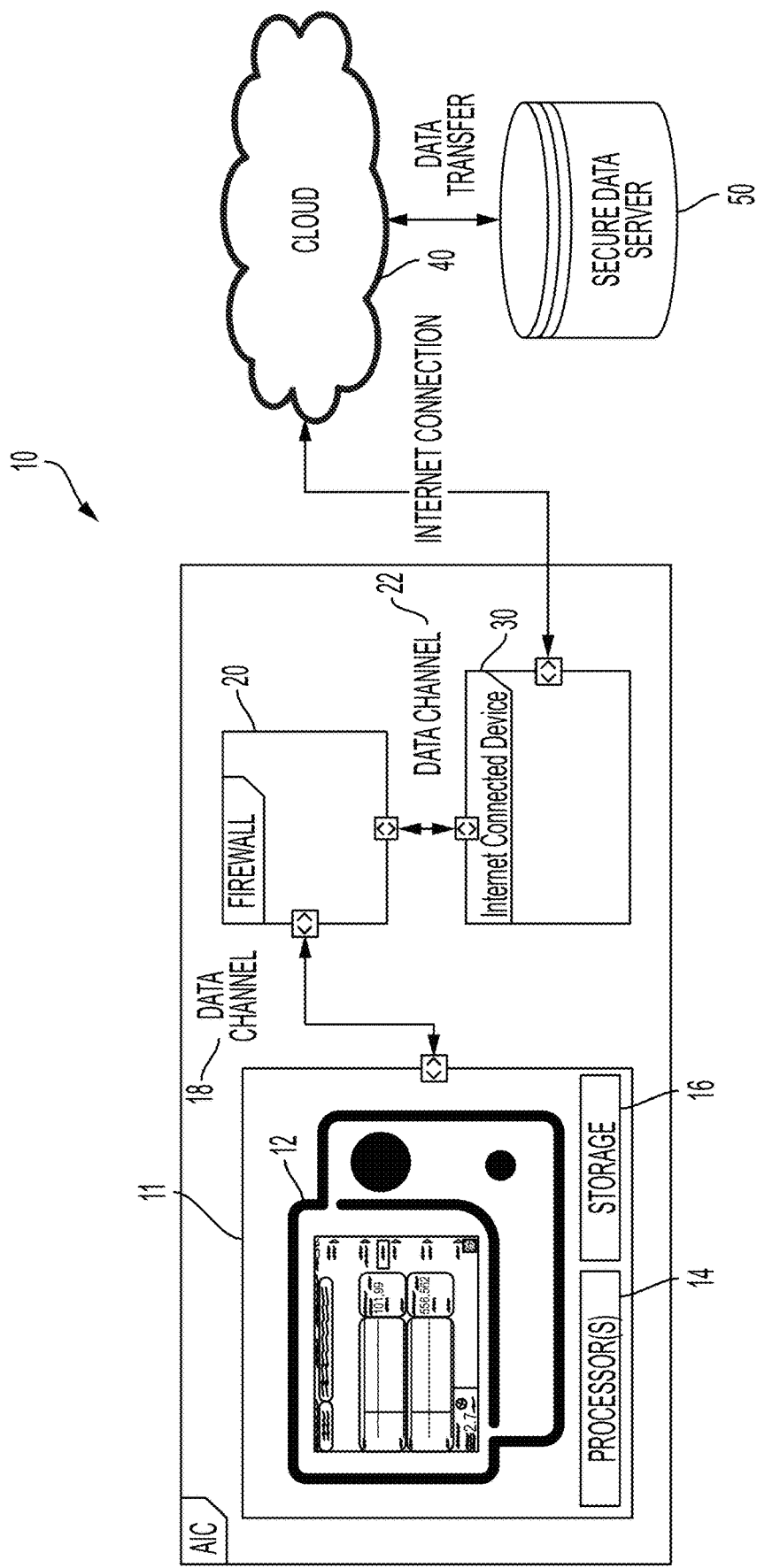
FIG. 1A illustrates components of a system for securely updating software on a medical device, in accordance with some embodiments of the present technology.

FIG. 1A illustrates a system 10 for securely updating software on an Internet-connected medical device in accordance with some embodiments. System 10 may include medical device 11 configured to display data (e.g., via display 12) associated with operation of the medical device. In the example shown in FIG. 1A, medical device 11 is a controller for a cardiac support system that includes the controller and a heart pump configured to be inserted into a patient's heart. An example of a heart pump is shown and describe with reference to FIG. 1B. The controller may be configured to control operation of the heart pump and receive information from the heart pump corresponding to operation of the heart pump. Collectively, the controller and the heart pump may provide blood pumping support to a patient undergoing a treatment such as a Percutaneous Coronary Intervention (PCI) or a high-risk PCI. Although medical device 11 is shown in FIG. 1A as a portion of a system (e.g., a controller) that includes another device (e.g., a heart pump), it should be appreciated that medical device 11 may, in some instances, be implemented as a single device that both measures information associated with a patient and/or operation of the medical device and processes that information for display.

The medical device 11 (e.g., a controller) may include a display 12 having a graphical user interface (GUI) displayed thereon for controlling one or more operations of the medical device and/or for showing one or more parameters associated with operation of the heart pump. Medical device 11 may also include one or more hardware computer processors 14 configured to process inputs received from the GUI provided on display 12, and/or process data received from one or more devices communicatively coupled to medical device 11. Medical device 11 may also include storage 16 in communication with processor(s) 14 and configured to store instructions that when executed by processor(s) 14 perform one or more processing functions. In some embodiments, storage 16 may include software that may be updated in accordance with the techniques described herein, to for example, support future improvement of device performance and/or provide support for new technology.

As shown in FIG. 1A, system 10 further includes firewall device 20 and Internet-connected device 30. Collectively firewall device 20 and Internet-connected device 30 may isolate and segregate medical device 11 from the Internet (e.g., cloud 40) to mitigate the security vulnerability risks associated with Internet-connected medical devices as described herein. For example, firewall device 20 may be configured to provide selective connectivity between Internet-connected device 30 and medical device 11, such that data can only flow from the medical device 11 to the Internet-connected device 30, and not vice versa. Although shown as separate components, in some embodiments firewall device 20 and Internet-connected device 30 may be integrated into a single component, with the hardware and software of the firewall device 20 and Internet-connected device 30 being segregated within the component using software and hardware partitioning.

In some embodiments, firewall device 20 may be integrated with the medical device 11 and may be configured to communicate with the medical device 11 using secure communication. For instance, medical device 11 may be configured to verify the authenticity of firewall device 20 using a secure handshake, and once authenticated, medical device 11 may be configured to establish a secure data channel 18 to firewall device 20 to allow transfer of data between medical device 11 and firewall device 20. In some embodiments, firewall device 20 may include software, and the software may not be remotely upgradable (e.g., via cloud 40).

Internet-connected device 30 may be communicatively coupled to firewall device 20 via data channel 22, and may be configured to enable firewall device to send data over the Internet using a secure communication channel. For instance, Internet-connected device 30 may be configured to provide connectivity to a secure data server 50 via cloud network 40 as shown in FIG. 1A. Secure data server 50 may be located remote from medical device 11 and may be configured to provide storage of incoming data from Internet-connected device 30 and/or provide retrieval of data requested by Internet-connected device 30 (e.g., software updates for medical device 11). In some embodiments, Internet-connected device 30 may include software that is remotely upgradable (e.g., via cloud 40).

Figure 1B:
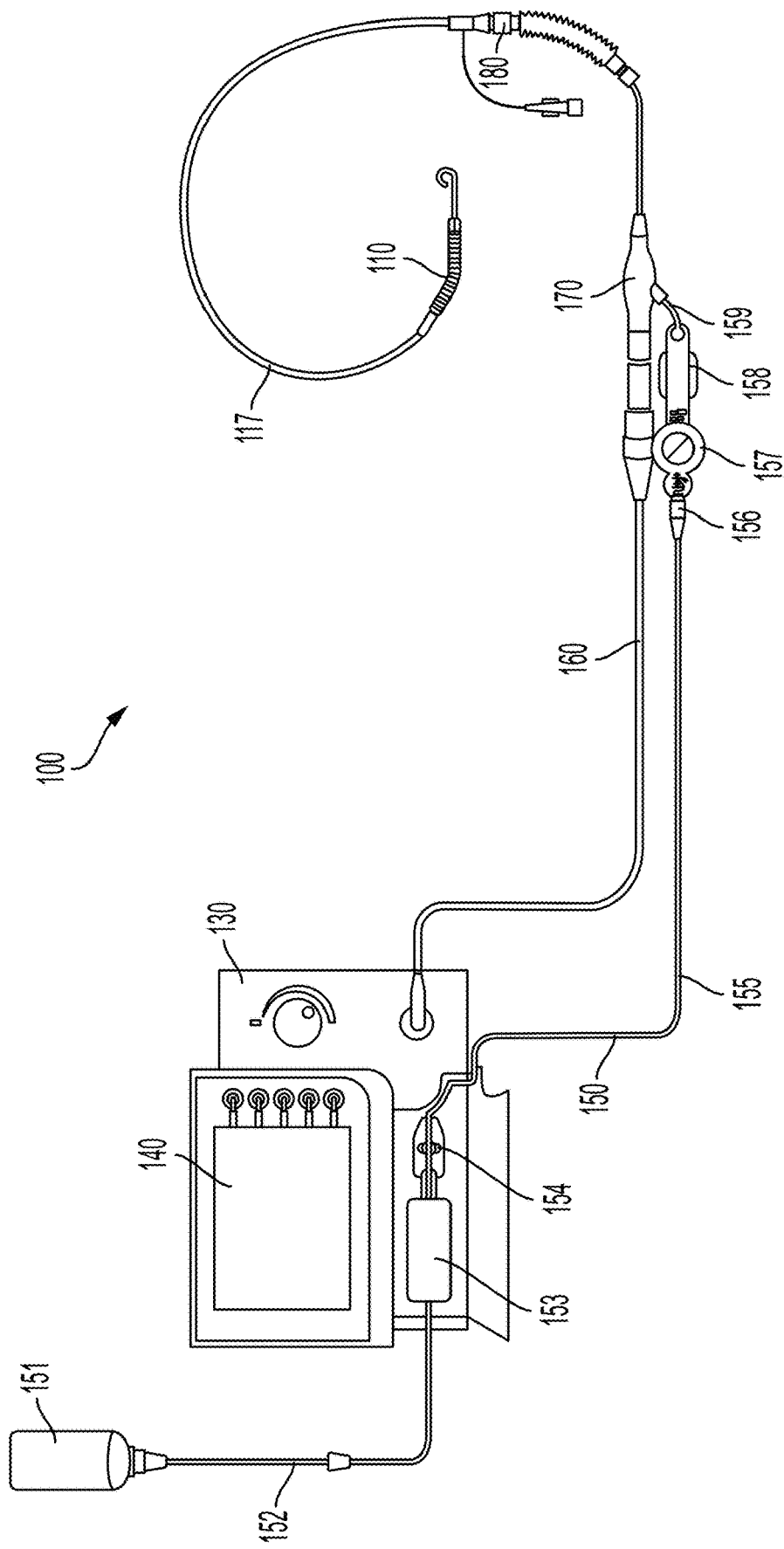
FIG. 1B shows an illustrative cardiac support system that may be used with some embodiments of the present technology.

A circulatory support device (also referred to herein as a "heart pump" or simply a "pump") may include a percutaneous, catheter-based device that provides hemodynamic support to the heart of a patient. As shown in FIG. 1B, heart pump 110 may form part of a cardiac support system 100. Cardiac support system 100 also may include a controller 130 (e.g., an Automated Impella Controller® referred to herein as an "AIC," from ABIOMED, Inc., Danvers, Mass.), a display 140, a purge subsystem 150, a connector cable 160, a plug 170, and a repositioning unit 180. As shown, controller 130 may include display 140. Controller 130 may be configured to monitor and control operation of heart pump 110. During operation, purge subsystem 150 may be configured to deliver a purge fluid to heart pump 110 through catheter tube 117 to prevent blood from entering the motor (not shown) of the heart pump. In some implementations, the purge fluid is a dextrose solution (e.g., 5% dextrose in water with 25 or 50 IU/mL of heparin, although the solution need not include heparin in all embodiments). Connector cable 160 may provide an electrical connection between heart pump 110 and controller 130. Plug 170 may connect catheter tube 117, purge subsystem 150, and connector cable 160. In some implementations, plug 170 includes a storage device (e.g., a memory) configured to store, for example, operating parameters to facilitate transfer of the patient to another controller if needed. Repositioning unit 180 may be used to reposition heart pump 110 in the patient's heart.

As shown in FIG. 1B, in some embodiments, the cardiac support system 100 may include a purge subsystem 150 having a container 151, a supply line 152, a purge cassette 153, a purge disc 154, purge tubing 155, a check valve 156, a pressure reservoir 157, an infusion filter 158, and a sidearm 159. Container 151 may, for example, be a bag or a bottle. As will be appreciated, in other embodiments the cardiac support system 100 may not include a purge subsystem. In some embodiments, a purge fluid may be stored in container 151. Supply line 152 may provide a fluidic connection between container 151 and purge cassette 153. Purge cassette 153 may control how the purge fluid in container 151 is delivered to heart pump 110. For example, purge cassette 153 may include one or more valves for controlling a pressure and/or flow rate of the purge fluid. Purge disc 154 may include one or more pressure and/or flow sensors for measuring a pressure and/or flow rate of the purge fluid. As shown, controller 130 may include purge cassette 153 and purge disc 154. Purge tubing 155 may provide a fluidic connection between purge disc 154 and check valve 156. Pressure reservoir 157 may provide additional filling volume during a purge fluid change. In some implementations, pressure reservoir 157 includes a flexible rubber diaphragm that provides the additional filling volume by means of an expansion chamber. Infusion filter 158 may help prevent bacterial contamination and air from entering catheter tube 117. Sidearm 159 may provide a fluidic connection between infusion filter 158 and plug 170. Although shown as having separate purge tubing and connector cable, it will be appreciated that in some embodiments, the cardiac support system 100 may include a single connector with both fluidic and electric lines connectable to the controller 130.

During operation, controller 130 may be configured to receive measurements from one or more pressure sensors (not shown) included as a portion of heart pump 110 and purge disc 154. Controller 130 may also be configured to control operation of the motor (not shown) of the heart pump 110 and purge cassette 153. As noted herein, controller 130 may be configured to control and measure a pressure and/or flow rate of a purge fluid via purge cassette 153 and purge disc 154. During operation, after exiting purge subsystem 150 through sidearm 159, the purge fluid may be channeled through purge lumens (not shown) within catheter tube 117 and plug 170. Sensor cables (not shown) within catheter tube 117, connector cable 160, and plug 170 may provide an electrical connection between components of the heart pump 110 (e.g., one or more pressure sensors) and controller 130. Motor cables (not shown) within catheter tube 117, connector cable 160, and plug 170 may provide an electrical connection between the motor of the heart pump 110 and controller 130. During operation, controller 130 may be configured to receive measurements from one or more pressure sensors of the heart pump 110 through the sensor cables (e.g., optical fibers) and to control the electrical power delivered to the motor of the heart pump 110 through the motor cables. By controlling the power delivered to the motor of the heart pump 110, controller 130 may be operable to control the speed of the motor.

Various modifications can be made to cardiac support system 100 and one or more of its components. For instance, one or more additional sensors may be added to heart pump 100. In another example, a signal generator may be added to heart pump 100 to generate a signal indicative of the rotational speed of the motor of the heart pump 110. As another example, one or more components of cardiac support system 100 may be separated. For instance, display 140 may be incorporated into another device in communication with controller 130 (e.g., wirelessly or through one or more electrical cables).

Figure 2:
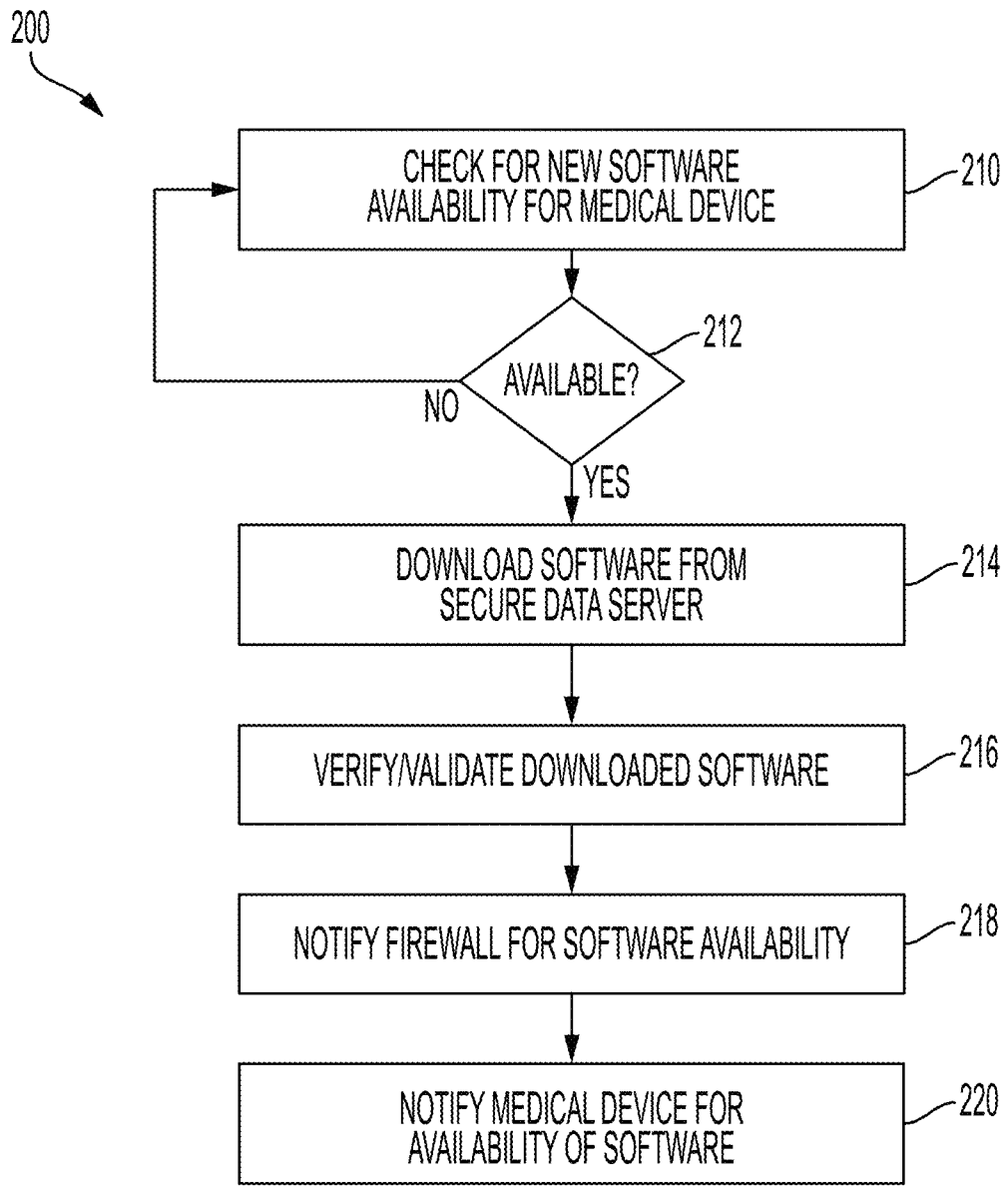
FIG. 2 is a flowchart of a process for initiating a software update process for a medical device, in accordance with some embodiments of the present technology.

FIG. 2 illustrates a process 200 for initiating a software update process for an Internet-connected medical device in accordance with some embodiments. In act 210, an Internet-connected device (e.g., Internet-connected device 30) may check for new software availability for the medical device (e.g., medical device 11). For instance, Internet-connected device 30 may be configured to periodically (e.g., every day, every week, every month) query secure data server 50 to determine whether software updates are available for medical device 11. In some embodiments, Internet-connected device 30 may be configured to query secure data server 50 in response to a user request.

Process 200 may then proceed to act 212, where it may be determined whether a software update for the medical device is available. If it is determined in act 212 that new software is not available, process 200 may return to act 210 where the Internet-connected device checks for new software availability for the medical device (e.g., after a predetermined amount of time). If it is determined in act 212 that a software update for the medical device is available, process 200 may proceed to act 214, where the new software is downloaded to storage associated with Internet-connected device 30 from the secure data server 50. Because Internet-connected device 30 is segregated from medical device 11, the downloaded software may be quarantined in storage associated with Internet-connected device 30 prior to being used to update medical device 11, which may mitigate the risk that the software update will compromise security and/or operation of the medical device.

Process 200 may then proceed to act 216, where the downloaded software stored in association with Internet-connected device 30 may be verified and/or validated. For instance, the Internet-connected device 30 may be configured to verify the downloaded software for data integrity and/or validate the downloaded software for data tampering. Process 200 may then proceed to act 218, where upon completion of the verifying/validating, the Internet-connected device 30 notifies the firewall device 20 that new software for medical device 11 is available. Process 200 may then proceed to act 220, where the firewall device 20 may notify the medical device 11 that a software update is available.

Figure 3:
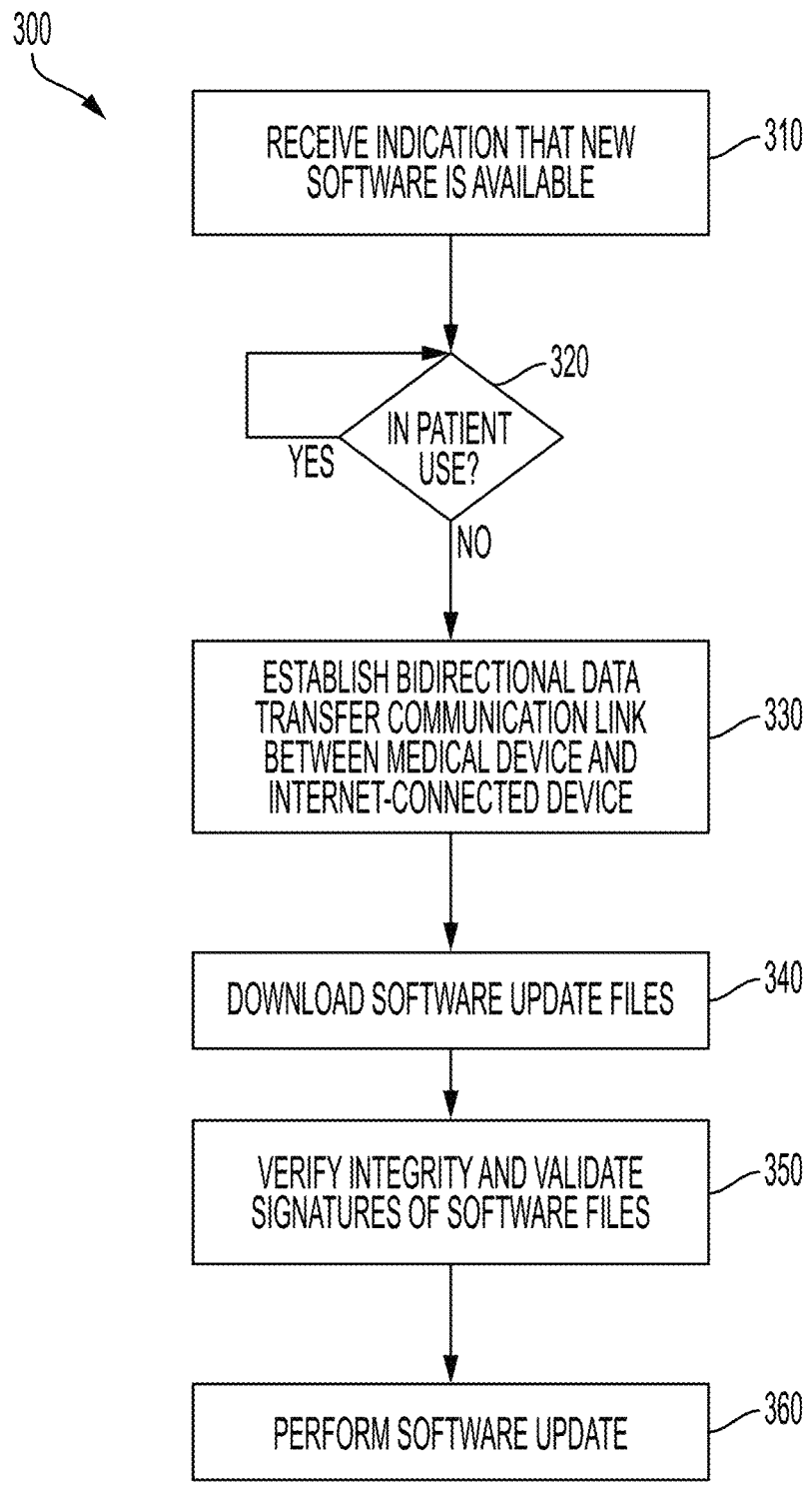
FIG. 3 is a flowchart of a process for securely updating software on a medical device, in accordance with some embodiments of the present technology.

FIG. 3 illustrates a process 300 for securely updating software for a medical device, in accordance with some embodiments. Process 300 begins in act 310, where a medical device receives an indication that new software is available for the medical device. For instance, as described in connection with act 220 of process 200 shown in FIG. 2, the indication that new software is available may be received from a firewall device (e.g., firewall device 20), which provides isolation between the medical device and Internet-connected sources (e.g., Internet-connected device 30, secure data server 50). Process 300 may then proceed to act 320, where it may be determined whether the medical device is currently being used with a patient (e.g., whether the medical device is being used for patient support). As described herein, the inventor has recognized that it may be desirable to update software for a medical device only when the device is not being used with a patient to mitigate the risk that such software updates will interfere with the operation of the medical device.

If it is determined that the medical device is currently in patient use, act 320 may continue until it is determined that the medical device is currently not in patient use. When it is determined in act 320 that the medical device is currently not in patient use (or alternatively is in a state in which software updates are permitted), process 300 may then proceed to act 330, where a bidirectional data transfer communication link may be established between the medical device 11 and the Internet-connected device 30. For instance, medical device 11 may be configured to issue a request to firewall device 20 to establish the bidirectional data transfer communication link. In response to receiving the request, firewall device 20 may be configured to establish secure data channel 18 between medical device 11 and firewall device 20 and establish secure data channel 22 between firewall device 20 and Internet-connected device 30. The request to establish the bidirectional data transfer communication link may be sent from medical device 11 to firewall device 20 in response to user input (e.g., by a user interacting with a GUI display on display 12 of medical device 11). In some embodiments, the request to establish the bidirectional data transfer communication link may be sent to firewall device 20 automatically without a user request. For instance, the medical device 11 may be configured to detect in act 320 whether the medical device is in an "idle" state indicating that the medical device is not currently being used for patient support. If it is determined the medical device is in an idle state, the request to establish the bidirectional data transfer communication link may automatically be sent from the medical device 11 to the firewall device 20 upon detection of the idle state. After the secure bidirectional data transfer communication link has been established, process 300 may then proceed to act 340, where the new software for the update may be downloaded via the secure bidirectional data transfer communication link (e.g., secure data channels 18 and 22) from storage associated with the Internet-connected device 30 to storage associated with medical device 11.

After downloading the software update from Internet-connected device 30, process 300 may then proceed to act 350, where the medical device 11 may verify the integrity of the data for the software update and may validate the signatures of the downloaded software files to ensure that the software files are the expected files and are safe to install on the medical device. Following verification and validation, process 300 may then proceed to act 360, where the software upgrade for the medical device 11 may be performed. In some embodiments, the medical device 11 may be configured to notify a user, e.g., via its display 12 about the status of the software upgrade process to enable the user to determine when the software update is complete and the medical device 11 is ready to be used with a patient. As will be appreciated, the user may be notified in other suitable manners, such as via a mobile device (e.g., via an e-mail or text message).

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The above-described embodiments of the present technology can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as a controller that controls the above-described function. A controller can be implemented in numerous ways, such as with dedicated hardware, or with general purpose hardware (e.g., one or more processor) that is programmed using microcode or software to perform the functions recited above, and may be implemented in a combination of ways when the controller corresponds to multiple components of a system.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system, comprising:
a firewall device;
an Internet-connected device communicatively coupled to the firewall device and at least one network; and
a medical device communicatively coupled to the firewall device, the medical device comprising:
at least one hardware computer processor;
a display configured to show a graphical user interface (GUI); and
at least one non-transitory storage device encoded with a plurality of instructions that, when executed by the at least one hardware computer processor perform a method for securely updating software stored by the at least one non-transitory storage device by:
receiving a notification from the firewall device that a software update for the medical device is available;
receiving a user input via the GUI to perform the software update;
determining whether the medical device is in a patient use state; and
in response to receiving the user input to perform the software update and determining that the medical device is not in a patient use state, sending a request to the firewall device to establish a bidirectional data transfer communication link between the medical device and the Internet-connected device,
wherein the firewall device and the Internet-connected device are configured to isolate the medical device from the at least one network.

2. The system of claim 1, wherein the Internet-connected device is configured to:
check whether new software is available for the medical device; and
download, via the at least one network, software from a secure data server, the software update for the medical device when new software is available for the medical device.

3. The system of claim 2, wherein the Internet-connected device is configured to check whether new software is available for the medical device by issuing a request to the secure data server to determine whether the new software is available.

4. The system of claim 2, wherein the Internet-connected device is configured to check whether new software is available for the medical device by receiving an indication from the secure data server that the new software is available.

5. The system of claim 2, wherein the Internet-connected device is further configured to:
verify data integrity of the software update.

6. The system of claim 5, wherein the Internet-connected device is further configured to:
validate the software update for data tampering.

7. The system of claim 5, wherein the Internet-connected device is further configured to:
notify the firewall device that the software update is available for the medical device when the data integrity of the software update is verified and/or the software update is validated for data tampering.

8. The system of claim 1, wherein the firewall device is configured to:
receive, from the Internet-connected device that the software update for the medical device is available; and
notify the medical device that the software update for the medical device is available.

9. The system of claim 8, wherein the firewall device is further configured to:
receive a request from the medical device to establish the bidirectional data transfer communication link between the medical device and the Internet-connected device; and
establish the bidirectional data transfer communication link between the medical device and the Internet-connected device in response to receiving the request.

10. The system of claim 1, wherein determining whether the medical device is in a patient use state is performed by determining whether the medical device is in an idle state during which it is safe to perform the software update.

11. The system of claim 1, wherein the method for securely updating software comprises:
downloading information associated with the software update via the bidirectional data transfer communication link.

12. The system of claim 11, wherein the method for securely updating software further comprises:
verifying data integrity of the information associated with the software update and/or validating one or more signatures associated with the information associated with the software update.

13. The system of claim 12, wherein the method for securely updating software further comprises:
updating the software stored by the at least one non-transitory storage device in response to verifying data integrity of the information associated with the software update and/or validating one or more signatures associated with the information associated with the software update.

14. The system of claim 13, wherein the method for securely updating software comprises:
providing on the GUI an indication of a status of the updating the software.

15. The system of claim 1, wherein
the firewall device and the Internet-connected device are integrated into a single component, and the single component is partitioned to separate components of the firewall device and components of the Internet-connected device.

16. The system of claim 1, wherein the medical device comprises a controller for a cardiac support system.

17. The system of claim 16, wherein the cardiac support system includes a heart pump.

18. A method of securely updating software for a medical device, the method comprising:
   receiving, by the medical device from a firewall device, an indication that a software update for the medical device is available;
   receiving, by a display configured to show a graphical user interface (GUI), a user input to perform the software update;
   determining whether the medical device is in a patient use state; and
   in response to receiving the user input to perform the software update and determining that the medical device is not a patient use state, sending a request to the firewall device to establish a bidirectional data transfer communication link between the medical device and an Internet-connected device, wherein the firewall device and the Internet-connected device are configured to isolate the medical device from at least one network communicatively coupled to the Internet-connected device.

* * * * *